//

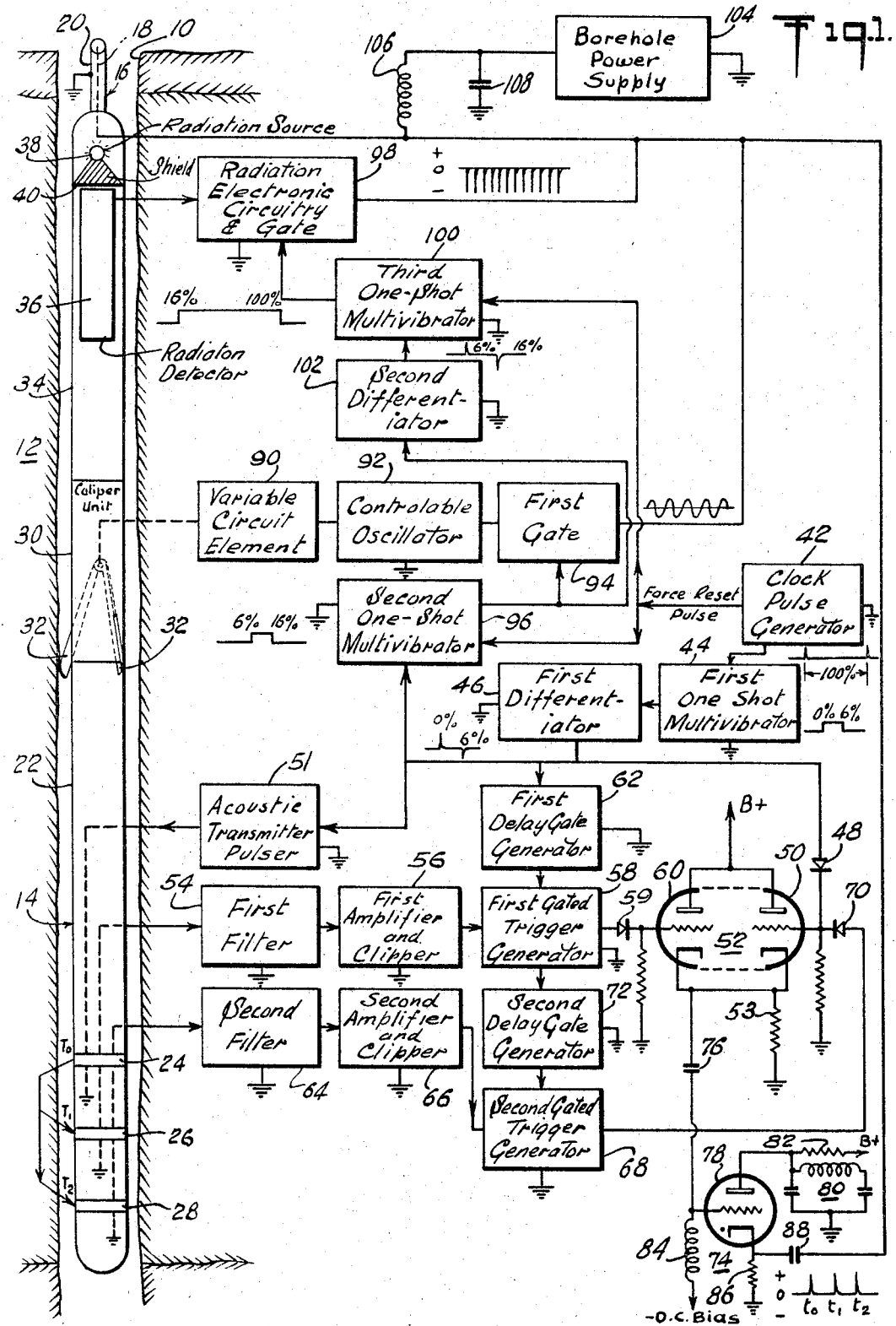

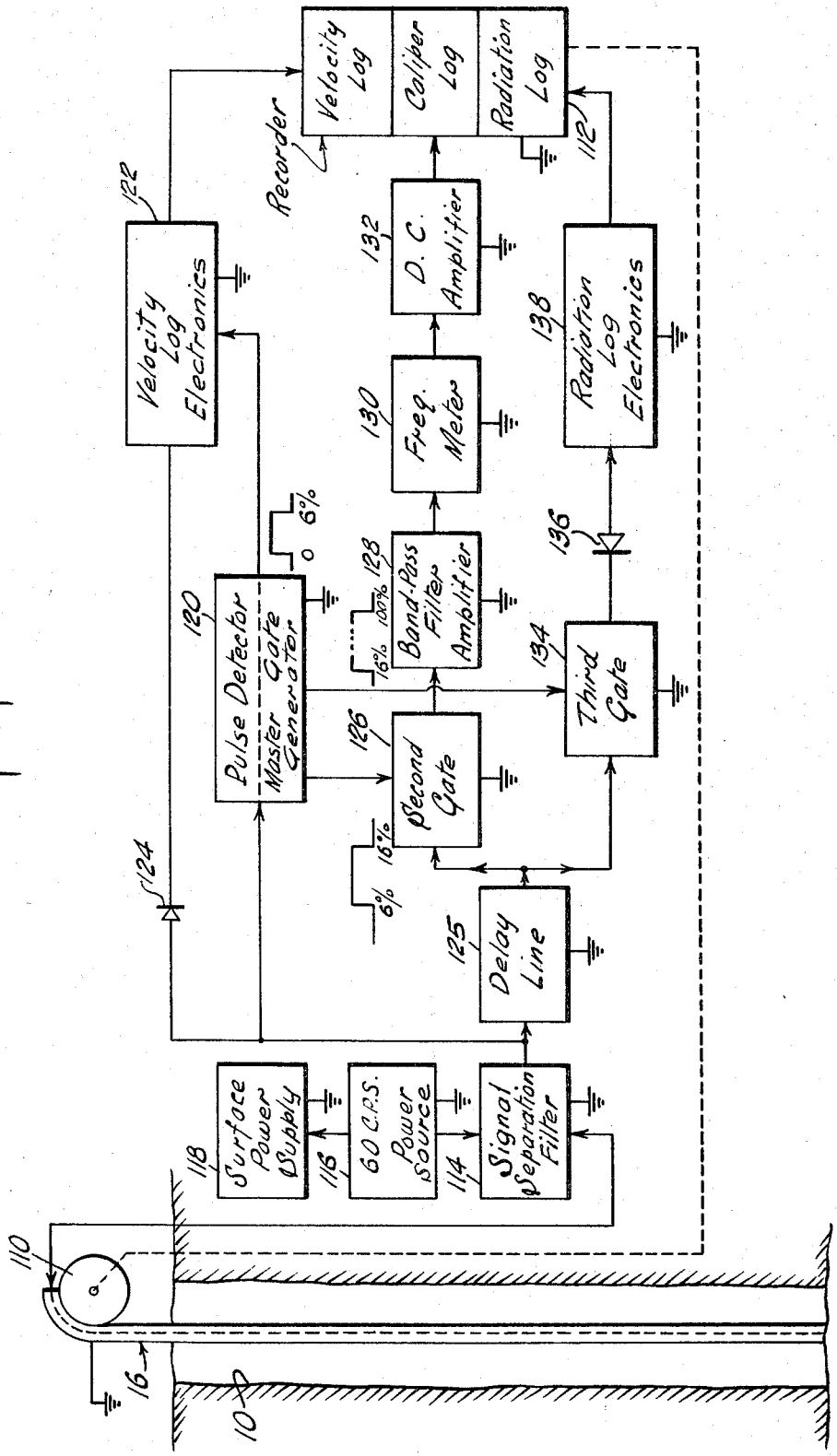

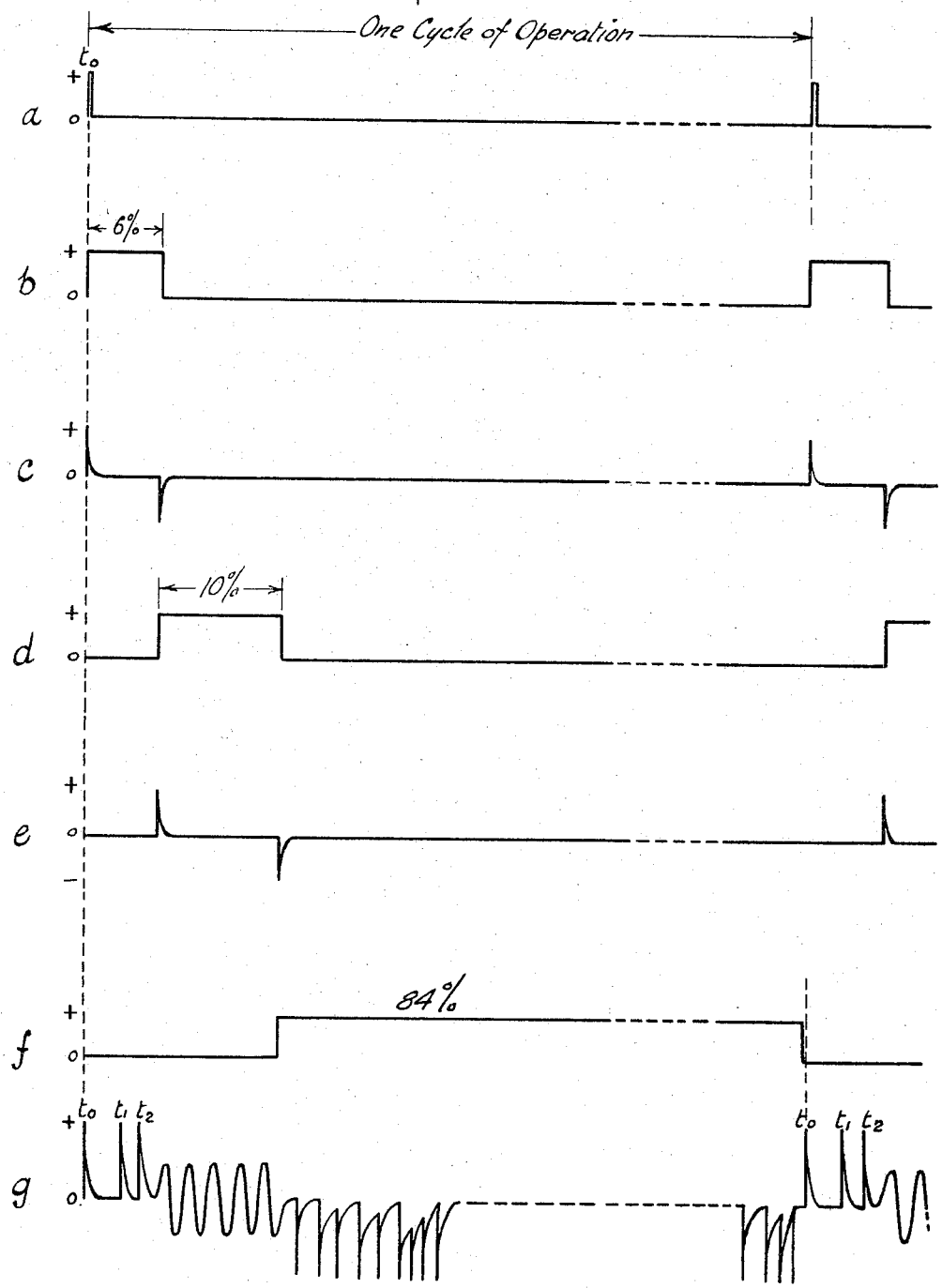

United States Patent Office 3,311,876
Patented Mar. 28, 1967

3,311,876
WELL LOGGING
Burton D. Lee, Houston, Tex., assignor to Texaco Inc., New York, N.Y., a corporation of Delaware
Filed Sept. 28, 1959, Ser. No. 843,005
5 Claims. (Cl. 340—18)

This invention relates to the determination of the nature of subsurface strata, and more particularly to a simultaneous determination of a plurality of physical properties of subsurface strata which has been traversed by a borehole.

In the present state of the art of acoustical well logging, acoustical velocity logs of formations surrounding a borehole are being provided by the use of a one receiver system, that is, a system having one acoustical transmitting transducer and one acoustical receiving transducer, or by the use of a two receiver system, that is, a system having one acoustical transmitting transducer and two acoustical receiving transducers, as disclosed in a copending application, Ser. No. 574,844, filed Mar. 29, 1956, of R. J. Loofbourrow, entitled, Acoustical Logging of Wells, now Patent No. 2,931,455, and in a copending application, Ser. No. 842,929, filed of even date, of K. D. Savage and L. E. Elliott, Jr., entitled, Acoustical Velocity Well Logging, now Patent No. 3,071,203. The difference in arrival times of an acoustic pulse at two of the spaced apart transducers is measured. Since the spacing between the transducers is known, the measurement of time of travel of the acoustic pulse from one transducer to another can be converted into and recorded as the velocity of the acoustic wave or pulse through the various subsurface formations. Travel time preferably may be recorded as microseconds per foot.

It is known that the reflection coefficients of elastic waves at an interface depends on the product of the acoustic velocity in and the density of each of the two beds forming the interface. Accordingly, it would be very desirable from a geophysical standpoint simultaneously to obtain velocity and density logs. Furthermore, this combination of logs also would be very desirable for the location of gas bearing zones.

It is an object of the present invention to provide an improved well logging system which produces both an acoustic log and a radioactivity log.

It is another object of this invention to provide a well logging system which simultaneously produces acoustic logs and radioactivity logs.

It is still another object of this invention to provide a well logging system for simultaneously producing acoustic and radioactivity logs which transmits signals through the borehole in a single insulated conductor cable.

Yet a further object of the present invention is to provide a well logging system which transmits a plurality of different signals from an exploring unit in a borehole to the earth's surface on a time sharing basis.

As stated hereinabove, there are two principal types of acoustical velocity well logging systems, one which employs a single receiver and another which employs two receivers. Although in the practice of the present invention either of these two acoustical velocity logging system may be employed, it is preferred to use the two receiver system since this system has been found to provide, in general, a more accurate acoustical velocity log. The two receiver acoustical velocity well logging system operates on the principle of measuring the difference in time of arrival of a sound wave, initiated by a transmitter transducer and refracted along the borehole-formation interface, at the first and second receiving transducers. The distance from the transmitting element to the second receiving transducer is generally of the order of a few feet, although in some instances it preferably may be of the order of a few inches. The pulse repetition rate is generally of the order of 30 to 50 pulses per second. If a transmitter to second receiving transducer distance of 5 feet is assumed and also a minimum formation velocity of 5000 feet per second and a pulse repetition rate of 50 pulses per second is assumed, it can be seen that under these conditions the total transit time of the acoustic pulse from the transmitter to the second receiver will be $t=5'/5000'$ per second$=1\times10^{-3}$ seconds. Since the time interval between acoustic pulses is $T=1/50$ seconds$=20\times10^{-3}$, then $T-t=19\times10^{-3}$ seconds. During the period $T-t$ the data circuit is idle.

In accordance with the present invention a well logging system is provided wherein acoustic information and radioactive information are alternately transmitted from the borehole to the surface equipment. More particularly, the invention provides a system wherein the acoustic information and radioactive information are alternately transmitted over a single conductor cable to surface equipment for simultaneously recording two logs. In a preferred embodiment of the invention the data is transmitted by using opposite polarities for pulses representing the different types of data in order to facilitate their separation in the surface equipment. The system includes electronic circuits necessary to provide each of the two logs and a precision time interval generator for controlling time intervals during which the subsurface signals are being transmitted to surface equipment. The time duration in which the acoustic signals are transmitted is preferably slightly longer than the maximum expected transit time of the acoustic pulse from the transmitting transducer to the second receiving transducer. Under the conditions assumed hereinabove, preferably, 1100 microseconds is devoted to transmission of acoustic log data, thus, approximately 94.5% of the duty cycle or cycle of operation is available for radioactivity data transmission, and, more particularly, for scattered gamma data transmission to provide a density log of the formation traversed by the borehole, without interfering with acoustic velocity data transmission.

Since both the velocity and scattered gamma logs are affected in some degree by borehole size or diameter variations, it is at times desirable to produce a caliper log along with the velocity and density logs. When a caliper log is produced in addition to the velocity and density logs the data transmission cycle is divided into three time intervals which may be, for example, 6% for acoustic data, 10% for caliper data, and 84% for the density or scattered gamma data.

For a better understanding of the invention reference may be had to the accompanying drawing in which:

FIGURE 1 is a circuit diagram primarily in block form illustrating the borehole equipment in accordance with the present invention, FIGURE 2 is a circuit diagram also primarily in block form illustrating the surface equipment of the system of the present invention, and FIGURE 3 is a time sequence diagram of the voltages developed in the system of the present invention.

Referring in more detail to FIGURE 1 of the drawing, a borehole 10 containing a borehole liquid, which may be any conventionally used borehole drilling mud, is shown traversing a subsurface formation 12 from which acoustic velocity and scattered gamma data is to be derived. Disposed within the borehole is an exploring unit or elongated tool 14 supported by a conventional 5/16" single insulated conductor borehole cable 16. The single conductor cable 16 includes a central conductor 18 generally composed of copper or other highly conductive metal and an outer sheath 20 made of steel strands having a strength sufficient to support the exploring unit 14 and its own weight in the borehole. The exploring unit 14 has an acoustical section 22 at the lower end thereof in which an acoustic pulse transmitting transducer 24, a first acoustic pulse receiving transducer 26 and a second acoustic pulse receiving transducer 28 are contained. The transmitting transducer 24 and the first receiving transducer 26 are spaced apart a distance of, preferably, 3 feet and the first and second receiving transducers are spaced apart a distance of, preferably, 2 feet. Each of the transducers is, preferably, of the lead zirconate titanate type or of the barium titanate type. The walls and the interior of the acoustical velocity section 22, particularly the portion thereof between the transducers 24 and 26, and 26 and 28, of the exploring unit 14 are made of a material in which the velocity of sound is not greater than the velocity of sound passing through the fluid in the borehole 10, preferably, a material in which velocities are less than 5000 feet per second and which can withstand the high pressures and temperatures encountered in a borehole, for example, a rubber-like material such as neoprene.

At the center of the exploring unit 14 is a caliper unit 30 having a plurality of fingers 32, preferably, three, spaced circumferentially around the exploring unit at 120 degree intervals. The fingers 32 of the caliper unit 30 are adapted to engage the wall of the borehole 10. To accomplish this result the fingers 32 may be spring biased so as to urge the fingers 32 toward the wall of the borehole 10.

The upper portion of the exploring unit 14 is a radioactivity section 34 which includes a radiation detector 36 responsive to scattered gamma rays, a gamma ray source 38, which may be radium or an artificially radioactive substance such as cobalt, and a suitable gamma ray shield 40, for example, a lead shield, disposed between the source 38 and the detector 36 to prevent direct transmission of the gamma rays from the radiation source 38 to the radiation detector 36.

As further shown in FIGURE 1 of the drawing, a clock pulse generator 42 which generates a precision time base, preferably, a pulse $t_0$ at a constant repetition rate of between 30 and 50 pulses per second has its output connected to a first one-shot multivibrator 44 which produces at its output a positive square wave having a duration of 6% of the time between successive pulses from the clock pulse generator 42, that is, the square wave from the first one-shot multivibrator 44 has a duration of 6% of one cycle of operation of the system of the present invention. The square wave from the first one-shot multivibrator 44 is applied to a first differentiator 46 which produces at its output a positive pulse from the leading edge and a negative pulse from the trailing edge of the square wave. The positive pulse is applied through a first blocking diode 48 to the control grid of a first triode section 50 of a dual cathode follower 52 to produce across a cathode resistor 53 of the dual cathode follower 52 a pulse corresponding to pulse $t_0$. The positive pulse from the first differentiator 46 is also applied to an acoustic pulse transmitter 51 which in response to this positive pulse produces at its output a sharp electric pulse which is applied to the acoustical transmitting transducer 24 to produce an acoustic pulse, or more accurately, a train of acoustic pulses for transmission through subsurface formations, such as, formation 12, to the receiving transducers 26 and 28. When acoustic pulses are received at the first receiving transducer 26 the corresponding voltage from the receiving transducer is applied to the first filter which, preferably, has a low cut-off frequency of approximately 5 kilocycles and a high pass up to about 60 kilocycles. The voltages passing through the first filter 54 are then applied to a first amplifier and clipper 56 which may be of a conventional type. A first gated trigger generator 58 produces, in response to the voltages from the first amplifier and clipper 56, a single pulse $t_1$ which is indicative of the time of arrival at the first receiving transducer 26 of a first portion of acoustic energy from the acoustic pulse or train of acoustic pulses produced by the transmitting transducer 24. The single pulse from the first gated trigger generator 58 is applied through a second blocking diode 59 to the control grid of a second triode section 60 of the dual cathode follower 52 to produce a pulse across the cathode resistor 53 of the dual cathode follower 52 corresponding to pulse $t_1$. In order to minimize the passage of noise pulses through the first gated trigger generator 58, the trigger generator 58 is maintained normally in an inoperative condition. A first delay gate generator 62 which is responsive to the positive pulse from the first differentiator 46 is adapted to provide a voltage at its output which when applied to the first gated trigger generator 58 will render the generator operative during a period of time when an acoustic pulse is expected to arrive at the first receiving transducer 26.

When the acoustic energy from a pulse produced by the transmitting transducer 24 reaches the second receiving transducer 28 a corresponding voltage is developed by the second receiving transducer which is applied to a second filter 64 having a cut-off frequency of approximately 5 kilocycles. The voltages from the second filter 64 are applied to a second amplifier and clipper 66 which also may be of a suitable conventional type. A second gated trigger generator 68 produces in response to the voltages from the second amplifier and clipper 66 a single pulse $t_2$ at its output which is indicative of the time of arrival at the second receiving transducer 28 of a first portion of acoustic energy from the transmitting transducer 24. The single pulse $t_2$ from the second gated trigger generator 68 is applied through a third blocking diode 70 to the control grid of the first triode section 50 of the dual cathode follower 52 to produce a pulse across the cathode resistor 53 of the dual cathode follower 52 corresponding to pulse $t_2$. The second gated trigger generator 68 is also normally in an inoperative condition. A second delay gate generator 72 which is responsive to the pulse from the output of the first gated trigger generator 58 is adapted to provide at its output a voltage which when applied to the second gated trigger generator 68 renders the second generator operative during the period of time when an acoustic pulse produced by the transmitting transducer 24 is expected to arrive at the second receiving transducer 28.

The pulse $t_0, t_1$ and $t_2$ frrom the dual cathode follower 52 are applied to a cable pulsing circuit 74 through a coupling capacitor 76. The cable pulsing circuit 74 includes a hydrogen thyratron 78, a pulse forming network 80 connected at one terminal to the anode of the hydrogen thyratron 78 and at another terminal to ground, an anode resistor 82 connected between the anode of the thyratron 78 and a B+ supply, a choke 84 connected between the control grid of the thyratron 78 and a negative direct current bias source and a cathode resistor 86. The time constants of the cable pulsing circuit are such that when each of the pulses $t_0$, $t_1$ and $t_2$ are applied to the control grid of the thyratron 78 corresponding high-power, short-duration pulses are produced arcross the cathode resistor 86. These high-power short-duration pulses are then applied to the single conductor cable 16 through a coupling capacitor 88 for transmission to the surface equipment.

The caliper unit 30 may be of any suitable conventional type, for example, of the type disclosed in U.S. Patent 2,761,977, granted to A. S. McKay or of the type disclosed in U.S. Patent 2,852,696. As indicated in FIGURE 1 of the present drawing, the fingers 32 of the caliper unit are mechanically coupled to a variable circuit element 90 which may be a rheostat arrangement as disclosed in the abovementioned U.S. Patent 2,852,696 or a variable capacitor or inductor. The variable circuit element 90 is electrically coupled to a controllable oscillator 92 so as to produce at the output thereof a variable frequency sinusoidal wave controlled by the variable element 90.

In accordance with this invention a first gate 94 is provided between the output of the controllable oscillator 92 and the single conductor cable 16 so that the caliper data may be applied to the cable 16 for only a portion of each cycle as controlled by the gate 94. The gate 94 is, preferably, open for only 10% of each clock pulse cycle immediately following the transmission of the three pulses $t_0$, $t_1$ and $t_2$ from the acoustic velocity circuit in the exploring unit. The first gate is opened by applying thereto a positive square wave having a duration of 10% of the cycle of operation of the system from a second one-shot multivibrator 96 which is responsive to the negative pulse from the first differentiator 46.

The density logging circuit of the system of the present invention may be of any suitable conventional type such as that described in the above-identified McKay patent. As indicated in FIGURE 1 of the present drawing the radiation shield 40 is positioned between the source of gamma rays 38 and the gamma ray detector 36 of the exploring unit to prevent passage of the rays directly from the source 38 to the detector 36. Therefore, the detector 36 will receive substantially only rays which has been scattered in the formation opposite the exploring unit 14 so as to provide density data for transmission to the earth's surface. Pulses from the radiation detector 36 are applied to conventional radiation circuitry, which, preferably, includes gating means, where they may be suitably amplified before being transmitted to the earth's surface. This circuitry is represented in FIG. 1 of the drawing by block 98 which is labelled radiation electronic circuitry and gate. The radiation electronic circuitry and gate 98 applies pulses to the logging cable 16 only when a voltage wave having a duration of 84% of a cycle is applied thereto from a third one-shot multivibrator 100. The third one-shot multivibrator 100 is responsive to a negative pulse produced by a second differentiator 102 which differentiates the output voltage from the second one-shot multivibrator 96. The radiation information is applied to the logging cable 16 in the form of negative pulses so as to facilitate their separation from the other data in the cable 16 at the earth's surface.

The clock pulse generator 42 in addition to providing a time base in the form of pulses produced at a constant repetition rate which are applied to the first one-shot multivibrator 44 also provides a forced reset pulse at the beginning of each cycle which is applied to the second and third multivibrators 96 and 100. This reset pulse is applied to the multivibrators 96 and 100 to place these multivibrators in their proper operating condition in the event that an extraneous pulse has altered their predetermined state. The use of this reset pulse assures a "clear channel" for the transmission of the $t_0$ pulse through the cable 16 to the earth's surface. Emission of a clock pulse by generator 42 triggers the first one-shot multivibrator 44 to produce a positive going output pulse which is, in turn, fed to the first differentiator 46. When the output pulse of this differentiator reaches a sufficient positive value it triggers the acoustic transmitter pulser 51 and, simultaneously, via the path of the first blocking diode 48, dual cathode follower 52 and capacitor 76, triggers the hydrogen thyratron 78 of the cable pulsing circuit 74. It can be seen that there is a finite and fixed delay between the emission of the clock pulse and the triggering of the acoustic transmitter pulser 51 and the $t_0$ cable pulse. This time delay allows time to inactivate the radiation gate and thus provide the desired clear channel for the $t_0$ pulse.

A borehole power supply 104 which may be of any suitable conventional type is connected to the logging ceble 16 through a filter network which includes an inductor 106 connected between the logging cable 16 and the input of the borehole power supply 104 and a capacitor 108 which is connected between the input of the borehole power supply 104 and ground.

At the earth's surface the cable 16 engages a cable measuring device 110 which is provided to indicate the depth of the exploring unit 14 in the borehole and to drive at least one recording element of a recorder 112. The cable 16 is connected at the earth's surface to a signal separation filter 114 which is used to separate the well logging data from the 60 cycle per second energy of a power source 116 applied through the single conductor cable 16 to the borehole power supply 104. The 60 cycle per second power source 116 provides energy also for a surface power supply 118 which may be of any suitable conventional type.

A pulse detector and master gate generator 120 which is responsive to the pulse $t_0$ from the cable pulsing circuit 74 in the exploring unit 14 is coupled to the signal output of the signal separation filter 114. The pulse detector and master gate generator 120 may include circuits similar to those used in the exploring unit 14 to provide the 6%, 10% and 84% duration positive square waves at the outputs of the one-shot multivibrators. The positive pulses $t_0$, $t_1$ and $t_2$ which are transmitted through the signal conductor cable 16 to the signal separation filter 114 are applied to velocity log electronics 122 through a blocking diode 124. The velocity log electronics 122 may include a circuit which deletes the pulse $t_0$ and permits the pulses $t_1$ and $t_2$ to pass to an elapsed time measuring circuit before being recorded as a velocity log in the recorder 112, as disclosed in detail in the above-mentioned copending Savage and Elliott application. The velocity log electronics 122 is normally in an inoperative condition and is made operative for the first 6% of a cycle by applying thereto a positive square wave having a duration of 6% of a cycle from an output of the pulse detector and master gate generator 120.

The variable frequency sinusoidal wave from the output of the signal separation filter 114 which provides caliper data is applied through a delay line 125 and a second gate 126 to a band-pass filter amplifier 128 which is adapted to pass the range of frequencies produced at the output of the controllable oscillator 92 of the caliper unit 30 in the exploring unit 14. The output voltage from a frequency meter 130 which is coupled to the band-pass amplifier 128 is amplified by a direct current voltage amplifier 132 and recorded in the recorder 112. The frequency meter 130 is preferably a cycle counter frequency meter which is sometimes referred to as an events per unit time meter. This type of meter is digital in nature, capable of sampling on command and delivering a sustained indication, either digital or analog or both, of the number of events which occur during the sampling period. In the system of the present invention sampling occurs once each cycle during the interval which is 6 to 16 percent of the cycle. If desired, the frequency meter 130 may be a conventional rate meter. The second gate 126 is opened by applying thereto a positive square wave from the pulse detector and master generator 120 having a duration of 10% of a cycle and, more particularly, that portion of time which is between 6 and 16% of each cycle.

The negative pulses indicative of the radioactivity in the borehole are applied through the delay line 125, a third gate 134 and a blocking diode 136 to conventional surface radiation log electronics 138 before being recorded in the recorder 112. The third gate 134 is open for 84% of a cycle by applying a positive square wave having a duration of 84% of a cycle thereto from the generator 120, that is, radiation information is being passed through the third gate 134 during the time intervals, between 16 and 100% of each cycle.

The delay line 125 is provided to delay the caliper and radiation signals for a short time interval, for example, a few microseconds, to permit operation of the second and third gates 126 and 134 so that their initial rise time is over and the signal path fully open by the time a signal which should pass has arrived at the respective gate.

The time diagram in FIGURE 3 of the drawing shows the relationship of some of the voltages produced in the bore-hole equipment. The pulse at *a* represents the pulse $t_0$ at the cable pulsing circuit 74. The positive square wave which has a duration of 6% of a cycle, shown at *b* indicates the voltage at the output of the first one-shot multivibrator 44. The positive and negative voltages from the output of the first differentiator 46 which are separated by the time interval equal to 6% of a cycle are shown at *c*. The positive pulse shown at *c* is applied simultaneously to the dual cathode follower 52, to the acoustic transmitter pulser 51 and to the first delay gate generator 62. The negative pulse at *c* is applied to the second one-shot multivibrator 96 to initiate the positive square wave having a time duration of 10% of a cycle, illustrated at *d*, at the output of the second one-shot multivibrator 96. The second differentiator 102 differentiates the positive square wave illustrated at *d* to produce at the output thereof a positive pulse and a negative pulse as shown at *e* which are separated by a time duration of 10% of a cycle. The negative pulses shown at *e* is used to initiate a positive square wave, as shown at *f*, having a duration of 84% of a cycle at the output of the third one-shot multivibrator 100. At *g* of FIGURE 3 there is shown the signals in the single conductor cable 16. The pulses $t_0$, $t_1$ and $t_2$ are positive pulses and are applied to the cable 16 from the cable pulsing circuit 74 within the first 6% of a cycle of operation of the system. The variable frequency sine waves from the controllable oscillator 92 of the caliper unit 30 are applied to the cable 16 during the next 10% of the cycle and the negative pulses from the radiation circuit are applied to the cable 16 during the remaining 84% of each cycle.

Since a duration of each cycle is, preferably, from $\frac{1}{50}$ to $\frac{1}{30}$ of a second, it can be readily seen that the acoustic, caliper radiation signals can be separated at the earth's surface and each signal can be recorder continuously in the recorder 112, the time constants of the circuits in the surface equipment of the system often being of the order of the duration of at least one cycle of operation of the system.

Although a scattered gamma logging circuit has been described, it should be understood that other radiation logging circuits may be employed in the practice of the present invention. Furthermore, it should be understood that the caliper unit 30 described hereinabove may be replaced by other means which will indicate the diameter of the borehole. Also, the acoustical velocity logging circuit illustrated in the drawings may be replaced by a circuit employing a single acoustic receiver circuit.

Obviously many modifications and variations of the invention, as hereinabove set forth, may be made without departing from the spirit and scope thereof, and therefore only such limitations should be imposed as are indicated in the appended claims.

I claim:

1. A well logging system comprising an elongated exploring unit adapted to be passed through the bore of a well, means for generating an electrical pulse at a constant repetition rate, a first one-shot multivibrator responsive to said electric pulse for producing a square wave, a first differentiator coupled to the output of said first one-shot multivibrator for producing a first pulse at the leading edge of said square wave and a second pulse at the trailing edge of said square wave, means responsive to the first pulse from said first differentiator for transmitting an acoustic pulse through a subsurface formation traversed by the well bore between two spaced apart points on said unit, the repetition rate of said electric pulse being such that the time interval between successive electric pulses representing the time of a cycle of operation is at least several times longer than the expected longest time interval required for the acoustic pulse to travel between said two points through the subsurface formation, means for producing signals in the exploring unit indicative of the velocity of said acoustic pulse in the formation between said two points, a single transmission line, means for applying said velocity signals to one end of said single transmission line, means for producing signals in said exploring unit indicative of the well bore diameter, a first gate disposed between said borehole diameter signal producing means and the one end of said single transmission line, a second one-shot multivibrator responsive to the second pulse from said first differentiator for producing a square wave at the output thereof to open said first gate, the time intervals of each of the square waves produced by said first and second one-shot multivibrators being a small portion of the cycle of operation, means including gating means for producing signals in said exploring unit indicative of scattered gamma rays in a subsurface formation opposite said exploring unit, a second differentiator coupled to the output of said second one-shot multivibrator for producing a first pulse at the leading edge and a second pulse at the trailing edge of the square wave produced by the second one-shot multivibrator, a third one-shot multivibrator responsive to the second pulse from the second differentiator for producing an output signal to open said gating means for a portion of time which is a substantial portion of the cycle of operation to apply said scattered gamma ray signals to the one end of said single transmission line, means coupled to the other end of said transmission line for separating said velocity, borehole diameter and scattered gamma ray signals from each other and means for recording said separated signals.

2. A well logging system as set forth in claim 1 wherein a forced reset pulse is applied to said second and third one-shot multivibrators at the beginning of each cycle of operation.

3. A well logging system comprising an elongated exploring unit adapted to be passed through the bore of a well, means for generating an electrical pulse at a constant repetition rate, a first one-shot multivibrator responsive to said electric pulse for producing a square wave, a first differentiator coupled to the output of said first one-shot multivibartor for producing a first pulse at the leading edge of said square wave and a second pulse at the trailing edge of said square wave, means responsive to the first pulse from said first differentiator for transmitting an acoustic pulse through a subsurface formation traversed by the well bore between two spaced apart points on said unit, the repetition rate of said electric pulse being such that the time interval between successive electric pulses representing the time of a cycle of operation is at least several times longer than the expected longest time interval required for the acoustic pulse to travel between said two points through the subsurface formation, means for producing signals in the exploring unit indicative of the velocity of said acoustic pulse in the formation between said two points, a single transmission line, means for applying said velocity signals to one end of said single transmission line, first means for producing signals in said exploring unit indicative of a first logging parameter, a first gate disposed between said first signal producing means and the one end of said single transmission line, a second one-shot multivibrator responsive to the second pulse from said first differentiator for producing a square wave at the output thereof to open said first gate, the time intervals of each of the square waves produced by said first and second one-shot multivibrators being a small portion of the cycle of operation, means including gating means for producing signals in said exploring unit, indicative of a second logging parameter, a second differentiator coupled to the output of said second one-shot multivibrator for producing a first pulse at the leading edge and a second pulse the the trailing edge of the square wave produced by the second one-shot multivibrator, a third one-shot multivibrator responsive to the second pulse from the second differentiator for producing an output signal to open said gating means for a portion of time which is a substantial portion of the cycle of operation to apply said second signal to the one end of said single transmission line, means coupled to the other end of said transmission line for separating said velocity, first and second signals from each other and means for recording said separated signals.

4. A well logging system as set forth in claim 3 wherein a forced reset pulse is applied to said second and third one-shot multivibrators at the beginning of each cycle of operation.

5. A well logging system comprising an elongated exploring unit adapted to be passed through the bore of a well, means for generating an electric pulse at a constant repetition rate, means responsive to said electric pulse for transmitting an acoustic pulse through a subsurface formation traversed by the well bore between two spaced apart points on said unit, the repetition rate of said electric pulse being such that the time interval between successive electric pulses representing a cycle of operation is at least several times longer than the expected longest time interval required for an acoustic pulse to travel between said two points through the subsurface formation, means for producing signals in the exploring unit indicative of the velocity of said acoustic pulse in the formation between said two points, a single transmission line, means for applying said velocity signals to one end of said single transmission line during one portion of the cycle of operation, means for producing signals in said exploring unit indicative of the diameter of the well bore, means for applying said borehole diameter signals to said single transmission line during a second portion of the cycle of operation, means for producing signals in said exploring unit indicative of scattered gamma rays in a subsurface formation traversed by the well bore, means for applying said scattered gamma ray signals to said single transmission line during a third portion of the cycle of operation, means coupled to the other end of said transmission line for separating said velocity, borehole diameter and scattered gamma rays signals from each other and means for recording said separated signals, said signal separating means including three circuits, gating means and means for opening said gating means so as to apply each of said velocity, borehole diameter and scattered gamma ray signals to a different one of said three circuits, said gate opening means including a master gate generator producing voltages having a time duration and sequence corresponding to the time intervals during which the velocity borehole diameter and scattered gamma ray signals are applied to the single transmission line said recording means comprising means for recording said velocity, scattered gamma ray, and borehole diameter signals in correlation, whereby the reflection coefficients of elastic waves at interfaces between adjacent formation beds along the borehole may be determined from said recorded signals as a function of the poduct of the acoustic velocity in and the scattered gamma ray indicated density of the respective formation beds defining each interface and whereby said borehole diameter signal provides means for correcting for the effect of variations in the size of the borehole on both said acoustic velocity and said scattered gamma ray density signals and further including means for transmitting the pulse from said electric pulse generating means through said single transmission line and wherein said master gate generator is responsive to said electric pulse.

References Cited by the Examiner

UNITED STATES PATENTS

| 2,400,170 | 5/1946 | Silverman | 340—18 |
|---|---|---|---|
| 2,436,563 | 2/1948 | Frosch | 250—83.6 |
| 2,501,953 | 3/1950 | Martin | 340—18 |
| 2,573,137 | 10/1951 | Greer | 340—18 |
| 2,631,270 | 3/1953 | Goble | 340—18 |
| 2,659,014 | 11/1953 | Scherbatskoy | 340—18 |
| 2,713,147 | 7/1955 | Stripling | 340—18 |
| 2,740,945 | 4/1956 | Howes | 340—15 |
| 2,759,143 | 8/1956 | Arps | 340—18 |
| 2,761,977 | 9/1956 | McKay | 250—83.6 |
| 2,768,701 | 10/1956 | Summers | 340—18 |
| 2,905,258 | 9/1959 | Broding | 340—18 |
| 2,936,375 | 5/1960 | McKay | 250—83.3 |
| 2,942,112 | 6/1960 | Hearn | 340—18 |
| 3,019,414 | 1/1962 | Peterson | 340—18 |

OTHER REFERENCES

Hueter et al., Sonics, Wiley and Sons, 1955, pages 38–41 relied on.

Hunter, Acoustics, Prentice-Hall, Inc., 1957, pages 99–104 relied on.

BENJAMIN A. BORCHELT, *Primary Examiner.*

IRVING L. SRAGOW, CHESTER L. JUSTUS, SAMUEL FEINBERG, *Examiners.*

N. N. KUNITZ, V. J. DIPIETRO, R. M. SKOLNIK, W. KUJAWA, *Assistant Examiners.*